US 7,362,349 B2

(12) United States Patent
Nelson et al.

(10) Patent No.: US 7,362,349 B2
(45) Date of Patent: Apr. 22, 2008

(54) MULTI-PARTICIPANT CONFERENCE SYSTEM WITH CONTROLLABLE CONTENT DELIVERY USING A CLIENT MONITOR BACK-CHANNEL

(75) Inventors: Steve Nelson, San Jose, CA (US);
Victor Ivashin, Danville, CA (US);
Sean Miceli, Sunnyvale, CA (US);
Ronald Boskovic, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 1176 days.

(21) Appl. No.: 10/192,080

(22) Filed: Jul. 10, 2002

(65) Prior Publication Data

US 2004/0008635 A1  Jan. 15, 2004

(51) Int. Cl.
*H04N 7/15* (2006.01)
(52) U.S. Cl. .................. 348/14.08; 348/14.09
(58) Field of Classification Search ............. 348/14.09, 348/14.08, 14.01, 14.03
See application file for complete search history.

(56) References Cited

U.S. PATENT DOCUMENTS

| 5,581,702 A | 12/1996 | McArdle et al. |
| 5,608,872 A | 3/1997 | Schwartz et al. |
| 5,617,539 A * | 4/1997 | Ludwig et al. .......... 348/14.09 |
| 5,649,104 A | 7/1997 | Carleton et al. |
| 5,657,096 A | 8/1997 | Lukacs |
| 5,657,246 A | 8/1997 | Hogan et al. |
| 5,717,879 A | 2/1998 | Moran et al. |
| 5,737,011 A | 4/1998 | Lukacs |
| 5,761,419 A | 6/1998 | Schwartz et al. |
| 5,781,727 A | 7/1998 | Carleton et al. |
| 5,819,038 A | 10/1998 | Carleton et al. |
| 5,828,838 A | 10/1998 | Downs et al. |
| 5,838,914 A | 11/1998 | Carleton et al. |
| 5,859,974 A | 1/1999 | McArdle et al. |
| 5,870,547 A | 2/1999 | Pommier et al. |

(Continued)

FOREIGN PATENT DOCUMENTS

CA  2234085  10/1999

(Continued)

OTHER PUBLICATIONS

Willebeek-Lemair, M. H., et al., "Centralized versus Distributed Schemes for Videoconferencing," Proceedings of the 5th IEEE Workshop on Future Trends of Distributed Computing Systems (FTDCS), Aug. 28, 1995, pp. 85-93.

*Primary Examiner*—Stella Woo

(57) ABSTRACT

A videoconferencing system configured to utilize peer-to-peer videoconferencing software to provide a multi-participant conference environment for a plurality of participants is provided. The system includes a client component defining a conference client enabled to execute peer-to-peer videoconferencing software. The client component includes a client monitor configured to monitor both, whether the conference channel is active and events within a video window displayed by the conference client, wherein the events within the video window are communicated across a back-channel connection. The back-channel connection is established when the conference channel is active. The system includes a server component having a back-channel controller in communication with the client monitor through the back-channel connection. The server component provides a client configurable audio/video stream for each of a plurality of participants. A graphical user interface and methods for providing a multi-participant conferencing environment are provided.

34 Claims, 13 Drawing Sheets

U.S. PATENT DOCUMENTS

| | | |
|---|---|---|
| 5,872,922 A | 2/1999 | Hogan et al. |
| 5,896,128 A * | 4/1999 | Boyer .................... 348/14.09 |
| 5,915,091 A | 6/1999 | Ludwig et al. |
| 5,923,844 A | 7/1999 | Pommier et al. |
| 5,938,724 A | 8/1999 | Pommier et al. |
| 5,944,785 A | 8/1999 | Pommier et al. |
| 5,963,547 A | 10/1999 | O'Neil et al. |
| 5,991,276 A | 11/1999 | Yamamoto |
| 6,006,253 A | 12/1999 | Kumar et al. |
| 6,008,804 A | 12/1999 | Pommier et al. |
| 6,061,717 A | 5/2000 | Carleton et al. |
| 6,075,571 A | 6/2000 | Kuthyar et al. |
| 6,081,291 A | 6/2000 | Ludwig, Jr. |
| 6,105,055 A | 8/2000 | Pizano et al. |
| 6,195,091 B1 | 2/2001 | Harple et al. |
| 6,202,084 B1 | 3/2001 | Kumar et al. |
| 6,212,206 B1 | 4/2001 | Ketcham |
| 6,342,906 B1 | 1/2002 | Kumar et al. |
| 6,426,948 B1 | 7/2002 | Bowman-Amuah |
| 6,693,661 B1 | 2/2004 | Vanderwilt et al. |
| 6,760,749 B1 | 7/2004 | Dunlap et al. |
| 6,823,452 B1 | 11/2004 | Doyle et al. |
| 2001/0032241 A1 | 10/2001 | Illa et al. |
| 2001/0042098 A1 | 11/2001 | Gupta et al. |
| 2001/0043571 A1 | 11/2001 | Jang et al. |
| 2001/0055058 A1 * | 12/2001 | Milovanovic et al. ... 348/14.01 |
| 2002/0002584 A1 | 1/2002 | Takagi et al. |
| 2002/0019984 A1 | 2/2002 | Rakib |
| 2002/0087638 A1 | 7/2002 | Rhee et al. |
| 2002/0091768 A1 | 7/2002 | Balasubramanian |
| 2002/0101829 A1 | 8/2002 | Murai et al. |
| 2002/0126201 A1 * | 9/2002 | Schmitt et al. .......... 348/14.09 |
| 2002/0133491 A1 | 9/2002 | Sim et al. |
| 2004/0243805 A1 | 12/2004 | Enokida |
| 2005/0188016 A1 | 8/2005 | Vdaygiri et al. |

FOREIGN PATENT DOCUMENTS

| | | |
|---|---|---|
| GB | 2319135 | 5/1998 |
| GB | 2352845 | 2/2001 |
| WO | 95/10157 | 4/1995 |
| WO | 9929108 | 6/1999 |
| WO | 9930494 | 6/1999 |
| WO | 0128249 | 4/2001 |
| WO | 0135655 A2 | 5/2001 |
| WO | 02057848 | 7/2002 |

* cited by examiner

2 Participants
2 Connections Each

3 Participants
4 Connections Each

4 Participants
6 Connections Each

2 Participants
2 Connections Each

3 Participants
3 Connections Each

4 Participants
4 Connections Each

Subconferencing

MULTI-PARTICIPANT CONFERENCE SYSTEM WITH CONTROLLABLE CONTENT DELIVERY USING A CLIENT MONITOR BACK-CHANNEL

CROSS REFERENCE TO RELATED APPLICATIONS

This application is related to U.S. patent application Ser. No. 10/192,130, filed on the same day as the instant application and entitled "METHOD AND APPARATUS FOR CONTROLLABLE CONFERENCE CONTENT VIA BACK-CHANNEL VIDEO INTERFACE." This application is hereby incorporated by reference.

BACKGROUND OF THE INVENTION

1. Field of the Invention

This invention relates generally to videoconferencing systems and more particularly to a system capable of utilizing pre-existing peer-to-peer videoconferencing applications and a multi-point control unit (MCU) managed by a participant-controllable content delivery interface.

2. Description of the Related Art

Conferencing devices are used to facilitate communication between two or more participants physically located at separate locations. Devices are available to exchange live video, audio, and other data to view, hear, or otherwise collaborate with each participant. Common applications for conferencing include meetings/workgroups, presentations, and training/education. Today, with the help of videoconferencing software, a personal computer with an inexpensive camera and microphone can be used to connect with other conferencing participants. The operating systems of some of these machines provide simple peer-to-peer videoconferencing software, such as MICROSOFT'S NETMEETING application that is included with MICROSOFT WINDOWS based operating systems. Alternatively, peer-to-peer videoconferencing software application can be inexpensively purchased separately. Motivated by the availability of software and inexpensive camera/microphone devices, videoconferencing has become increasingly popular.

Video communication relies on sufficiently large and fast networks to accommodate the high information content of moving images. Audio and video data communication also demand adequate bandwidth as the number of participants and the size of the data exchange increase. Even with compression technologies and limitations in content size, sufficient bandwidth for multi-party conferences is not readily available using common and inexpensive transport systems.

FIGS. 1A-1C illustrate the content transfer requirements for each participant in a two, three, or four member conference, respectively. As can be seen, each member must send and receive content from each of the other participants. As the number of participants increase, so too does the connection requirements for each participant. For example, where there are two participants each participant requires two connections, where there are three participants each participant requires four connections, where there are four participants each participant requires six connections, and so on. As a consequence of the increased connection requirements, the systems supporting these requirements become more sophisticated and of course, more expensive. Thus, most inexpensive videoconferencing systems limit a participant to connecting with only one other member, i.e. a peer-to-peer connection.

Devices are available to address the excessive amount of connections. A Multi-point Control Unit (MCU) helps resolve the connection issue by establishing a central location for connection by all participants. An MCU is an external device that efficiently allows three or more participants to establish a shared conference. A peer-to-peer connection is established between the MCU and each conference participant using the participant videoconference software. FIGS. 2A-2C illustrates the connection reduction offered by a MCU as compared to the connection requirements of FIGS. 1A-1C. In particular, for two participants, each participant has two connections, for three participants, each participant has three connections, for four participants, each participant has four connections, and so on. While the MCU reduces the amount of outgoing connections each participant must manage, the incoming content transfer requirements are still too high to manage large conferences.

An MCU can offload more processing from the participant's machine by reducing the content it sends to each participant. For example, an MCU can choose to send only the content of the participant who is speaking. Alternately, the MCU can choose to combine participant audio and video signals. When combining video, signal loss will occur as each participant's video signal is scaled to a smaller fraction of its original size. Often MCUs will combine only the audio signals so that all members can be heard, and send only the video signal of the active speaker. By using these offloading techniques, less information needs to be transferred to each participant.

A shortcoming of the MCU is the lack of flexibility allowed for the conference participants. That is, there is a small fixed set of configuration features offered to the participants. In addition, the MCU is often managed by a remote administrator that further limits any dynamic configuration of the conference presentation by the participants. Yet another, limitation in using peer-to-peer software with the MCU is that the peer-to-peer software is not designed to provide features for a multi-participant conference environment. More particularly, the peer-to-peer software applications, whether included with an operating system or purchased separately, is limited to features provided exclusively for peer-to-peer conferencing environments.

As a result, there is a need to solve the problems of the prior art to provide a method and apparatus for enabling a multi-participant videoconferencing environment where the participants have peer-to-peer videoconferencing software such that the videoconferencing environment allows the user flexibility in defining configuration features and content delivery.

SUMMARY OF THE INVENTION

Broadly speaking, the present invention fills these needs by providing a method and system for providing a multi participant videoconferencing environment with clients having pre-existing peer-to-peer videoconferencing applications. It should be appreciated that the present invention can be implemented in numerous ways, including as a process, a system, or a graphical user interface. Several inventive embodiments of the present invention are described below.

In one embodiment, a videoconferencing system configured to utilize peer-to-peer videoconferencing software to provide a multi-participant conference environment for a plurality of participants is provided. The system includes a client component. The client component includes a conference client enabled to execute peer-to-peer videoconferencing software. The conference client communicates video and audio data across a conference channel. The client component includes a client monitor configured to monitor both, whether the conference channel is active and events within a video window displayed by the conference client, wherein the events within the video window are communicated across a back-channel connection. The back-channel connection is established when the conference channel is active. The system includes a server component, the server component having a back-channel controller in communication with the client monitor through the back-channel connection. The server component provides a client configurable video stream for each of a plurality of participants.

In another embodiment, a videoconferencing system is provided. The videoconferencing system includes a client component having a client in communication with a client monitor. The videoconferencing system includes a server component. A conference channel defined between the client component and the server component is included. The conference channel provides a first path for real-time video/audio data to be exchanged between the client component and a conferencing endpoint of the server component for a videoconference session. A back-channel defined between the client component and the server component is included. The back-channel provides a second path for system information to be exchanged between the client monitor and the server component.

In yet another embodiment, a conferencing system configured to provide a multi-user conference environment to deliver customizable information to a plurality of participants is provided. The conferencing system includes a client component. The client component includes a conference client. A client monitor is included in the client component. The client monitor is configured to monitor an activity of the conference client, wherein the activity occurs over a video frame displayed by the conference client. The conferencing system includes a server component. The server component includes a media hub server component providing a conference connection. The media hub server component includes a media mixer that is configured to assemble audio and video data to be supplied to the conference client from audio and video data received by the media mixer from a plurality of conference clients. The media mixer includes a video layout processor configured to generate a composite video image for each of the plurality of conference clients. The media mixer also includes an audio distribution processor for providing an audio signal for each of the plurality of conference clients. The server component includes a connection manager allowing connections of several participants into logical rooms for shared conference communications. The connection manager includes a back-channel controller enabling communication between the client monitor and the media hub server component. The connection manager also includes an event handler configured to insert interface data into an outbound video stream image through the video layout processor.

In still yet another embodiment, a graphical user interface (GUI) for a videoconference rendered on a computer monitor is provided. The GUI includes a first region defining an integrated video component. The integrated video component is associated with a client. The integrated video component has a plurality of participant video images. The integrated video component is monitored to detect user activity within a display window of the integrated video component. The GUI includes a second region providing access to files of a computer system. The second region allows a user to select one of the files for transmission to a server supporting the videoconference, wherein the server communicates the selected one of the files to participants of the videoconference.

In another embodiment, a method for providing a multi-user conference environment for multiple participants is provided. The method initiates with establishing a server component for enabling a conference channel connection between the server component and a conference client associated with a participant. Then, audio and video data from the participant is provided to the server component over the conference channel connection. Next, system preferences are communicated to the server component for each of the multiple clients over a back-channel connection. Then, combined audio and video data is distributed to the participant over the conference channel connection. The combined audio and video data is presented as defined by the system preferences. Next, an interaction of the participant with a video image presented on the conference client is monitored. Then, a signal indicating the interaction to the server component is transmitted over the back-channel connection. In response to the signal indicating the interaction, the combined audio and video data is modified and distributed to the conference client over the conference channel connection.

In yet another embodiment, a method for creating a multi-user conferencing environment between conference clients having peer-to-peer conferencing applications is provided. The method initiates with providing a server component configured to emulate a peer-to-peer connection for each of the conference clients. Then, a conference channel is defined for communication between conference clients and the server component. Next, activities of a user in an active region of a video display associated with one of the conference clients are monitored. Then, an active selection by a user in the active region is reported to the server component. The reporting of the active selection occurs outside of the conference channel. In response to the active selection reporting being received by the server component, a configuration of an audio/video signal is modified and provided to the conference clients.

In still yet another embodiment, a computer readable media having program instructions for creating a multi-user conferencing environment between conference clients having peer-to-peer conferencing applications and a server component configured to emulate a peer-to-peer connection for each of the participants is provided. The computer readable media includes program instructions for defining a conference channel for communication between conference clients and the server component. Program instructions for monitoring activities of a user with one of the conference clients are included. Program instructions for reporting the monitored activities to the server component over a back-channel connection are included. Program instructions for modifying a video and audio signal provided to the conference clients in response to the reported activities being received by the server component are also included.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

Figure 1A:
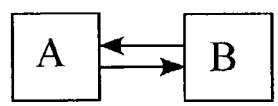
FIGS. 1A-1C illustrate the content transfer requirements for each participant in a two, three, or four member conference, respectively.
Figure 1B:
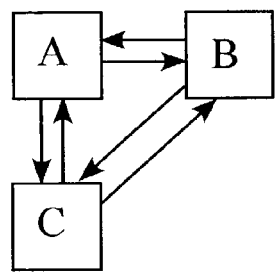
Figure 1C:
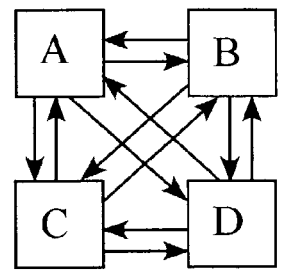
Figure 2A:
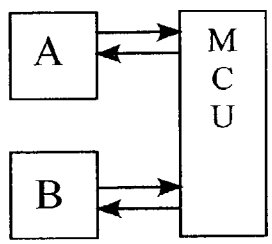
FIGS. 2A-2C illustrates the connection reduction offered by a MCU as compared to the interconnections of FIGS. 1A-1C.
Figure 2B:
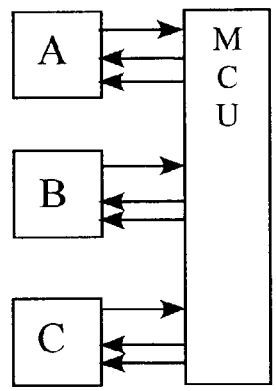
Figure 2C:
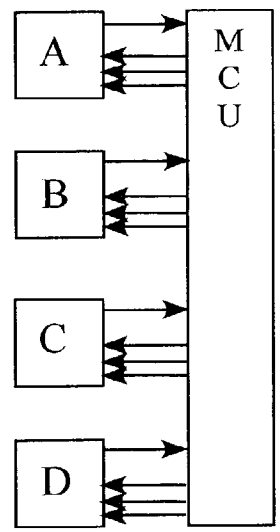

An invention is described for an apparatus and method for a videoconferencing system having a multipoint controller configured to mix audio/video streams from multiple participants into a single audio/video stream. The multipoint controller is configured to provide server constructed interface elements into the audio/video stream based upon client monitored events. It will be obvious, however, to one skilled in the art, that the present invention may be practiced without some or all of these specific details. In other instances, well known process operations have not been described in detail in order not to unnecessarily obscure the present invention. FIGS. 1A-1C and 2A-2C are described in the "Background of the Invention" section.

The embodiments of the present invention provide a method and apparatus for providing a multi-user conferencing environment. The multi-user conferencing environment includes a multi-point control unit enabled to provide multi-participant features while connecting clients having pre-existing peer-to-peer videoconferencing software. The conferencing system includes a parallel connection to the conference channel that allows for the ability to define functionality through a client monitor that watches the participant's interactions with the pre-existing videoconferencing software's. In one embodiment, the participant's interactions that occur in a window displaying the video stream are monitored. In effect, the client monitor acts similarly to a conference user, with respect to watching the pre-existing videoconferencing software's video stream. It should be appreciated that the code defining the client monitor executes externally to the conference client, i.e., the client monitor code is separate and distinct from the conference client software. As used herein, the terms client monitor and external client monitor are interchangeable.

The videoconferencing system includes a client component and a server component. The client component includes a client monitor and a conference client. The client monitor captures input from the conference client. In one embodiment, the conference client is a peer-to-peer videoconferencing application. One example of a peer-to-peer videoconferencing application is MICROSOFT'S NETMEETING application. However, one skilled in the art will appreciate that any peer-to-peer videoconferencing application is suitable for the embodiments described herein. Thus, the system enhances pre-existing applications, which may already be installed on a personal computer, with increased functionality enabled through data provided by the client monitor. In addition, the client monitor can incorporate a graphical user interface (GUI) in which the video window of the peer-to-peer application is a component.

The client monitor provides the captured input from the conference client to a server component. The captured input is transmitted to the server component through a separate connection, i.e., a back-channel connection, that operates in parallel with the existing conference client's conference channel. In one embodiment, the back-channel system enables the server to dynamically modify the GUI being presented to a participant based on the captured input provided to the server component. For example, the client monitor can capture events, such as mouse clicks or mouse clicks in combination with keyboard strokes, executed by a user when his mouse pointer is within a region of the conference client that displays the video signal. In one embodiment, the events are transmitted through a back-channel connection to the server component for interpretation. Thus, the back-channel connection allows for active regions and user interface objects within the video stream to be used to control functionality and content. Consequently, users, i.e., also referred to as participants herein, indirectly control video given to different regions in the layout based upon server processing of client events. As will be described below, additional communication exchange is available between participants using this system's back-channel connection.

Figure 3:
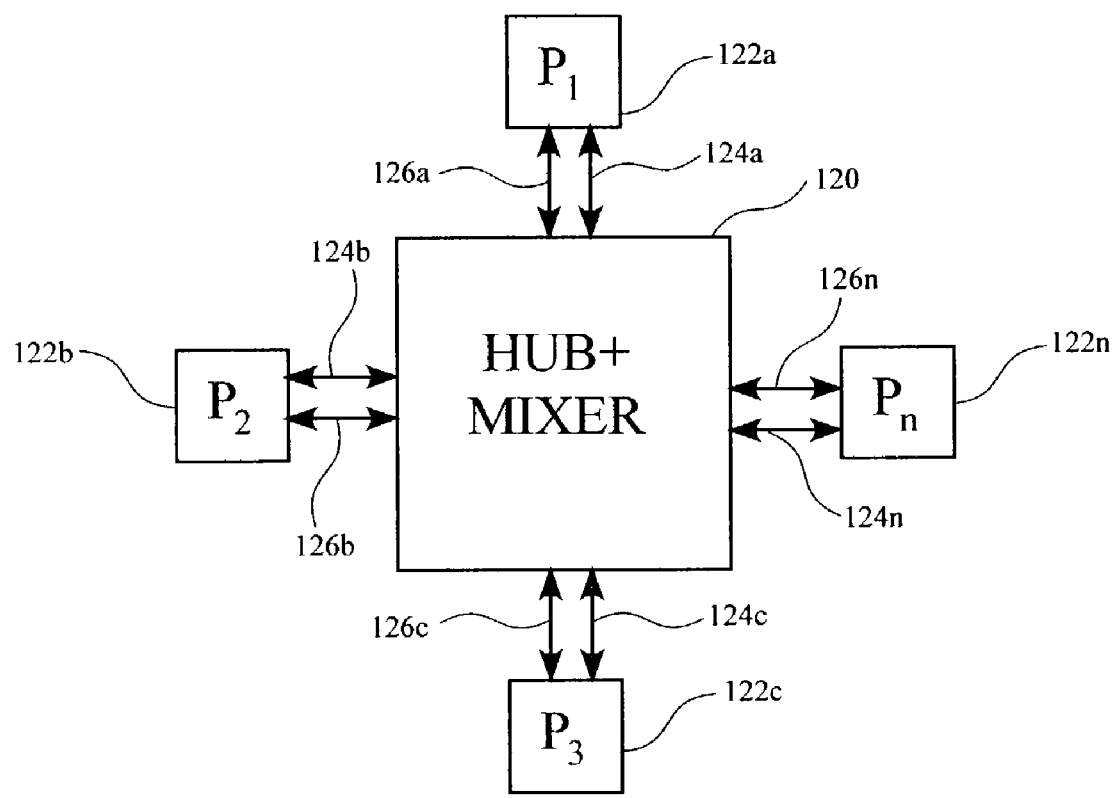
FIG. 3 is a simplified schematic diagram of a high level overview of a videoconferencing system having a back-channel communication link in accordance with one embodiment of the invention.

FIG. 3 is a simplified schematic diagram of a high level overview of a videoconferencing system having a back-channel communication link in accordance with one embodiment of the invention. Hub and mixer 120 represent the server side component of the videoconferencing system. Participants P1 122*a* through Pn 122*n* represent the client component of the videoconferencing system. Each of the participants interface with server component 120 through two communication links. Communication link 124 is a conference channel providing real time audio and video signals between the client component and server component 120. One skilled in the art will appreciate that conference channels 124*a*-124*n* can support any suitable standards for use on packet switched Internet Protocol (IP) networks, such as H.323 standards, Session Initiation Protocol (SIP) standards, etc. Back-channel connection 126 is a communication link that allows input, i.e., events captured from the video display region or a client monitor graphical user interface (GUI) of client component 122, to be transmitted to server component 120.

Figure 4:
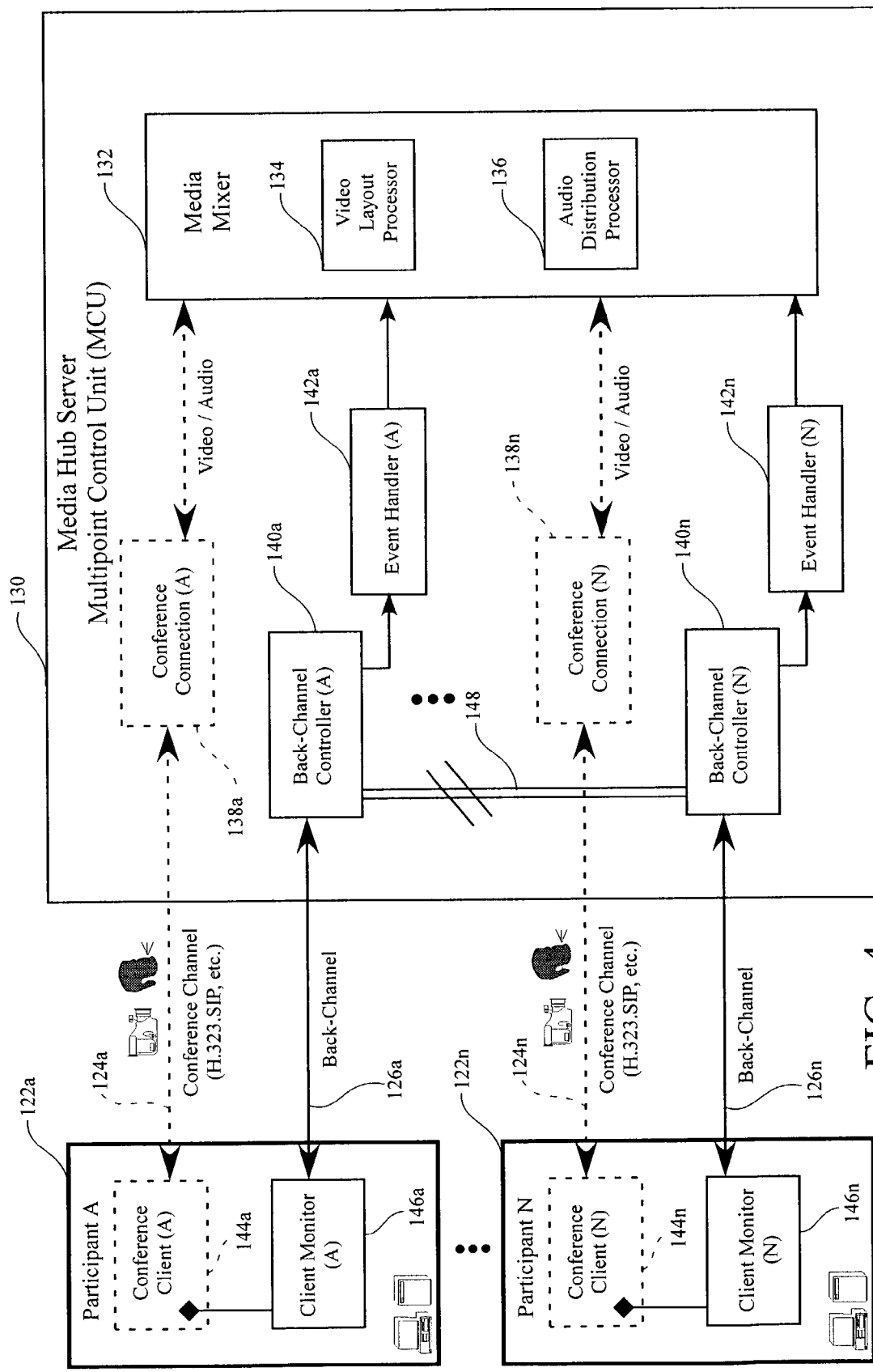
FIG. 4 is a schematic diagram of the components for a multi-participant conference system using a client monitor back-channel in accordance with one embodiment of the invention.

FIG. 4 is a schematic diagram of the components for a multi-participant conference system using a client monitor back-channel in accordance with one embodiment of the invention. The client component includes multiple participants, such as participant A 122*a* through participant N 122*n*. Each participant 122 includes conference client 144 and client monitor 146. For example, participant A 122*a* includes conference client A 144*a* and client monitor A 146*a*. In one embodiment, conference client A 144*a* includes the participant's peer-to-peer videoconferencing software. The role of conference client A is to place calls to another participant, establish and disconnect a conferencing session, capture and send content, receive and playback the content exchanged, etc. It should be appreciated that calls from conference client A 144*a* route through media hub server 130. Other participants similarly use their associated conference client to place calls to media hub server 130 to join the conference. In one embodiment, conference client A 144*a* includes a high-level user-interface for the conference, such as when the conference client is a pre-existing software application. For example, a product that provides peer-to-peer videoconferencing is the NETMEETING application software from MICROSOFT Corporation.

Client monitor (CM) 146 is monitoring conference client 144. CM 146*a* is configured to monitor conference client A 144*a*. That is, CM 146*a* looks at how a user is interacting with the software application by monitoring a video display window of client A 144*a* in one embodiment. In addition, CM 146*a* interprets the users interactions in order to transmit the interactions to the server component. In one embodiment, CM 146 is configured to provide four functions. One function monitors the start/stop of a conference channel so that a back-channel communication session can be established in parallel to a conference channel session between the participant and the server component. A second function monitors events, such as user interactions and mouse messages, within the video window displayed by conference client 144. A third function handles control message information between the CM 146 and a back-channel controller 140 of the server component. A fourth function provides an external user-interface for the participant that can be used to display and send images to other conference members, show the other connected participants names, and other communication information or tools as described in more detail with reference to FIG. 14.

As mentioned above, client monitor 146 watches for activity in conference client 144. In one embodiment, this includes monitoring user events over the video display region containing the conference content, and also includes the conference session control information. For example, CM 146 watches for the start and end of a conference session or a call from the conference client. When conference client 144 places a call to media hub server 130 to start a new conference session, CM 146 also places a call to the media hub server. The call from CM 146 establishes back-channel connection 126 for the participant's conference session. Since CM 146 can monitor the session start/stop events, back-channel connection initiates automatically without additional user setup, i.e., the back-channel connection is transparent to a user. Accordingly, a new session is maintained in parallel with conference client 144 activity. It should be appreciated that conference channel 124 provides a video/audio connection between conference client 144 and conference connection 138 of media hub server 130. In one embodiment, conference channel 124 provides a communication link for real time video/audio data of the conference session communicated between the client component and the server component.

In one embodiment, CM 146 specifically monitors activity that occurs over the conference's video frame displayed by conference client 144. For example, CM 146 may monitor the video image in MICROSOFT'S NETMEETING application. Mouse activity in the client frame is relayed via protocol across back-channel connection 126 to media hub server 130. In turn, back-channel controller 140 can report this activity to another participant, or event handler 142 for the respective participant. In this embodiment, the monitoring of conference client 144 application occurs through a hook between the operating system level and the application level. As mentioned above, the video window can be watched for mouse clicks or keyboard strokes from outside of the videoconferencing application.

Figure 14:
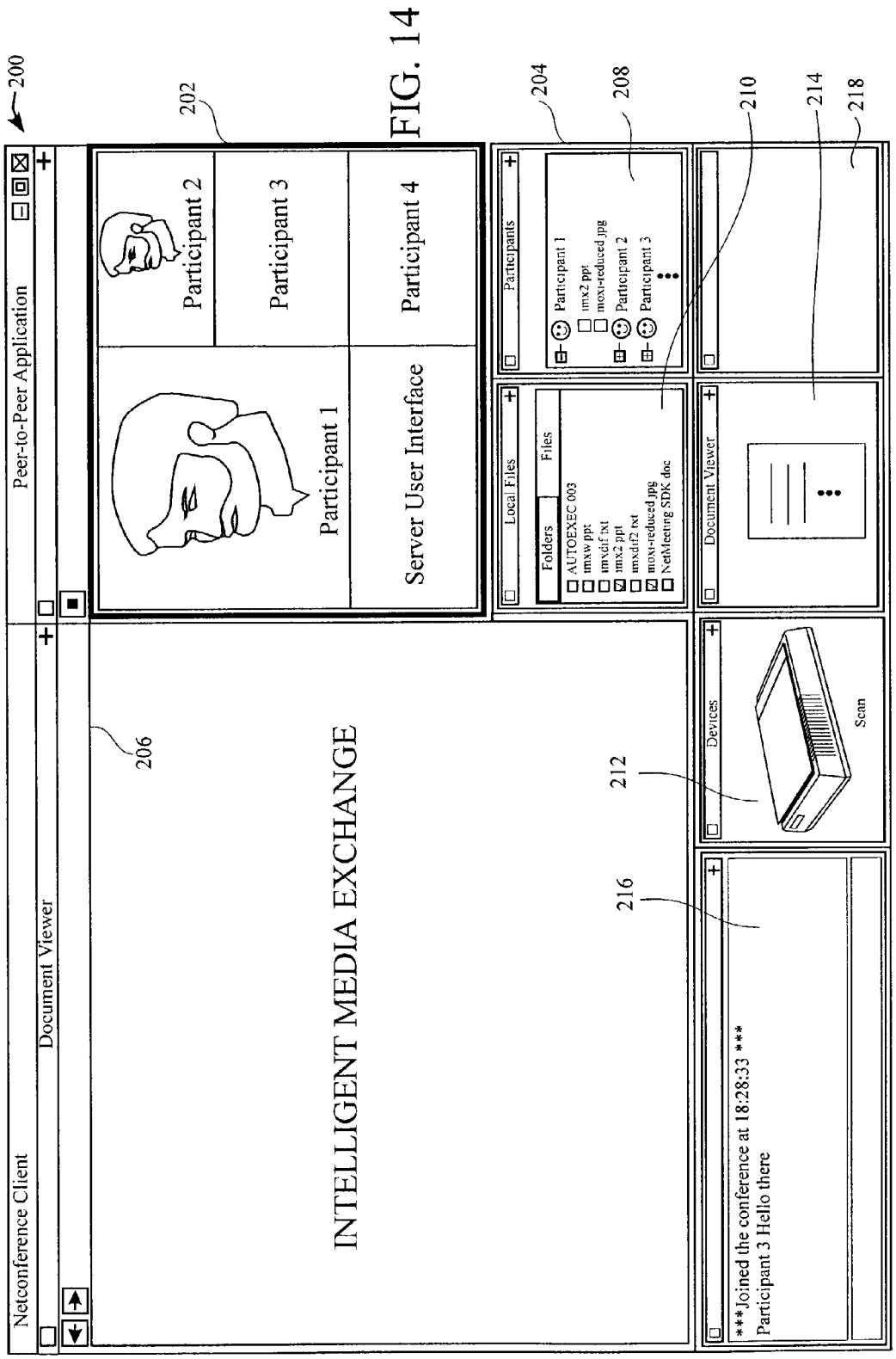
FIG. 14 is a schematic diagram of a client monitor graphical user interface which includes the user interface provided by the conference client in accordance with one embodiment of the invention.

In another embodiment, CM 146 can present a separate user-interface to the participant. This interface can be shown in parallel to the user interface presented by conference client 144 and may remain throughout the established conference. Alternatively, the user interface presented by CM 146 may appear before or after a conference session for other configuration or setup purposes. One embodiment of the user interface is illustrated in FIG. 14.

In yet another embodiment, CM 146 may provide an interface for direct connection to a communication session hosted by media hub server 130 without need for a conference client. In this embodiment, CM 146 presents a user interface that allows back-channel connection 126 to be utilized to return meeting summary content, current meeting status, participant information, shared data content, or even live conference audio. This might occur, for instance, if the participant has chosen not to use conference client 144 because the participant only wishes to monitor the activities of the communication. It should be appreciated that the client component can be referred to as a thin client in that conference client 144 performs minimal data processing. For example, any suitable videoconference application can be conference client 144. As previously mentioned, CM 146*a* is configured to recognize when the videoconference application of conference client A 144*a* starts and stops running, in turn, the CM can start and stop running as the conference client does. CM 146*a* can also receive information from the server component in parallel to the videoconference session. For example, CM 146*a* may allow participant A 122*a* to share an image during the conference session. Accordingly, the shared image may be provided to each of the client monitors so that each participant is enabled to view the image over a document viewer rather than through the video display region of the videoconference software. As a result, the participants can view a much clearer image of the shared document. In one embodiment, a document shared in a conference is available for viewing by each of the clients.

The server component includes media hub server 130, which provides a multi-point control unit (MCU) that is configured to deliver participant customizable information. It should be appreciated that media hub server 130 and the components of the media hub server are software code configured to execute functionality as described herein. In one embodiment, media hub server 130 is a component of a hardware based server implementing the embodiments described herein. Media hub server 130 includes media mixer 132, back-channel controller 140, and event handler 142. Media hub server 130 also provides conference connection 138. More specifically, conference connection A 138*a* completes the link allowing the peer-to-peer videoconferencing software of conference client A 144*a* to communicate with media hub server 130. That is, conferencing endpoint 138*a* emulates another peer and performs a handshake with conference client A 144*a*, which is expecting a peer-to-peer connection. In one embodiment, media hub server 130 provides Multipoint Control Unit (MCU) functionality by allowing connections of separate participants into selectable logical rooms for shared conference communications. As an MCU, media hub server 130 acts as a "peer" to a conference client, but can also receive calls from multiple participants. One skilled in the art will appreciate that media hub server 130 internally links all the participants of the same logical room, defining a multi-participant conference session for each room, each peer-to-peer conference client operating with the media hub only as a peer. As mentioned above, media hub server 130 is configured to conform to the peer requirements of conference client 144. For example, if the conference clients are using H.323 compliant conference protocols, as found in applications like MICROSOFT'S NETMEETING, media hub server 130 must also support the H.323 protocol. Said another way, the conference communication can occur via H.323 protocols, Session Initiated Protocols (SIP), or other suitable APIs that match the participant connection requirements.

Still referring to FIG. 4, media mixer 132 is configured to assemble audio and video information specific to each participant from the combination of all participants' audio and video, the specific participant configuration information, and server user-interface settings. Media mixer 132 performs multiplexing work by combining incoming data streams, i.e., audio/video streams, on a per participant basis. Video layout processor 134 and audio distribution processor 136 assemble the conference signals and are explained in more detail below. Client monitor-back-channel network allows media hub server 130 to monitor a user's interactions with conference client 144 and to provide the appearance that the peer-to-peer software application has additional functionality. The additional functionality adapts the peer-to-peer functionality of the software application, executed by conference client 144, for the multi-participant environment described herein. The client monitor-back-channel network includes client monitor 146 back-channel connection 126, back-channel controller 140, and event handler 142.

Back-channel connection 126 is analogous to a parallel conference in addition to conference channel 124. Back-channel controller (BCC) 140 maintains the communication link from each client monitor. Protocols defined on the link are interpreted at media hub server 130 and passed to the appropriate destinations, i.e., other participant's back-channel controllers, event handler 142, or back to the CM 146. Each of the back-channel controllers 140 are in communication through back-channel controller communication link 148.

In one embodiment, media hub server 130 provides a client configurable video stream containing a scaled version of each of the conference participants. A participant's event handler 142 in media hub server 130 is responsible for maintaining state information for each participant and passing this information to media mixer 132 for construction of that participants user-interface. In another embodiment, a server-side user-interface may also be embedded into the participant's video/audio streams as will be explained in more detail below with reference to FIG. 8.

Figure 5:
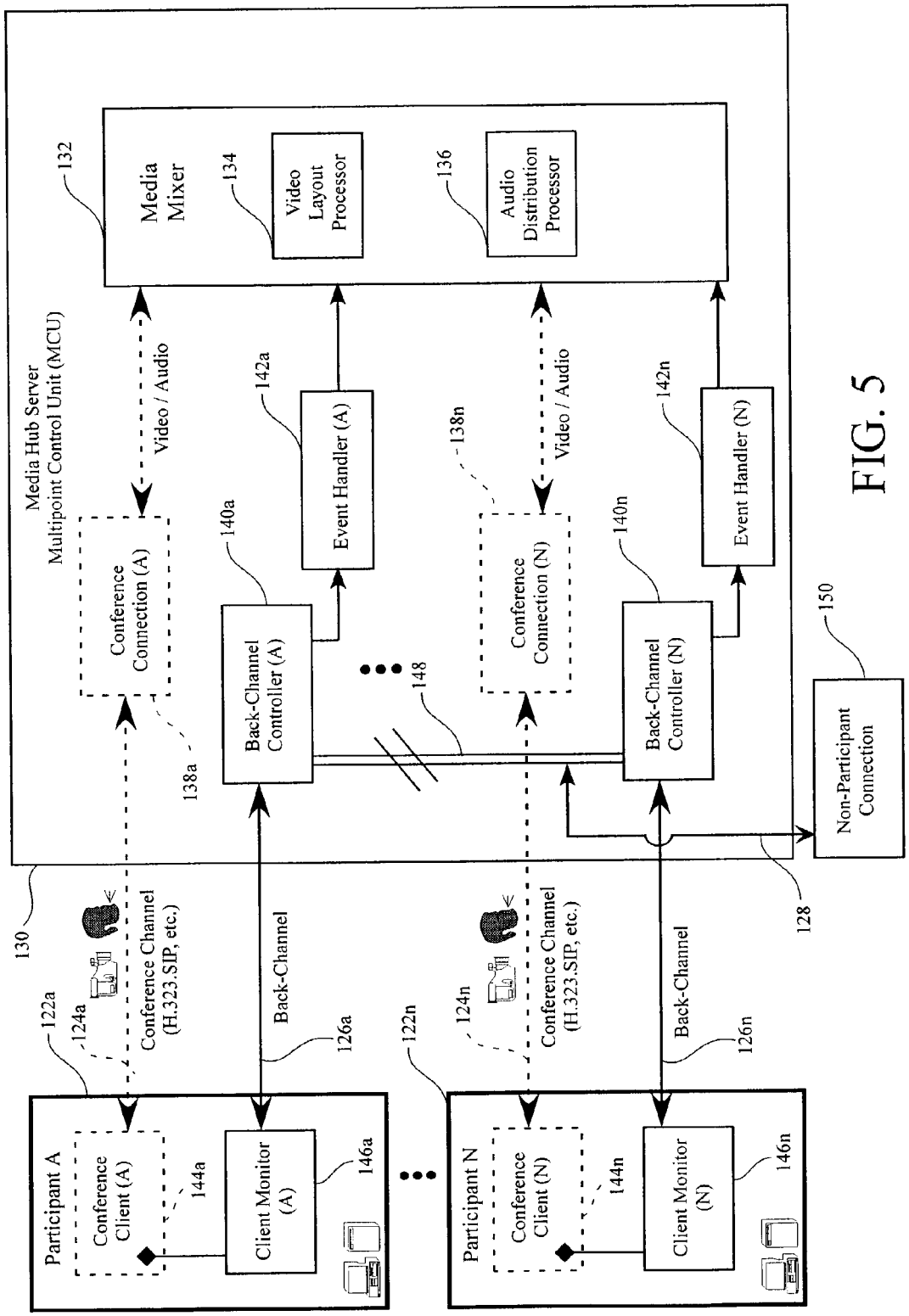
FIG. 5 is a schematic diagram of the components for a multi-participant conference system using a client monitor back-channel wherein a non-participant can join the conference in accordance with one embodiment of the invention.

FIG. 5 is a schematic diagram of the components for a multi-participant conference system using a client monitor back-channel wherein a non-participant can join the conference in accordance with one embodiment of the invention. Non-participant connection 150 is in communication with back-channel communication link 148. Here, a back-channel connection 128 can be established between non-participant client 150 and back-channel controllers 140 of media hub server 130. In one embodiment, back-channel communication link 148 enables each of the back-channel controllers to communicate among themselves, thereby enabling corresponding client monitors or non-participants to communicate via respective back-channel connections 126. Accordingly, images and files can be shared among clients over back-channel communication link 148 and back-channel connections 126. In addition, a non-participant back-channel connection can be used to gain access to media hub server 130 for query of server status, conference activity, attending participants, connection information, etc., in one embodiment. Thus, the non-participant back-channel connection acts as a back door to the server or a conference session. From the server, the non-participant can obtain information for an administrator panel that displays conference and server performance, status, etc. From the conference session the non-participant can obtain limited conference content across back-channel communication link 148, such as conference audio, text, images or other pertinent information to an active conference session.

Figure 6:
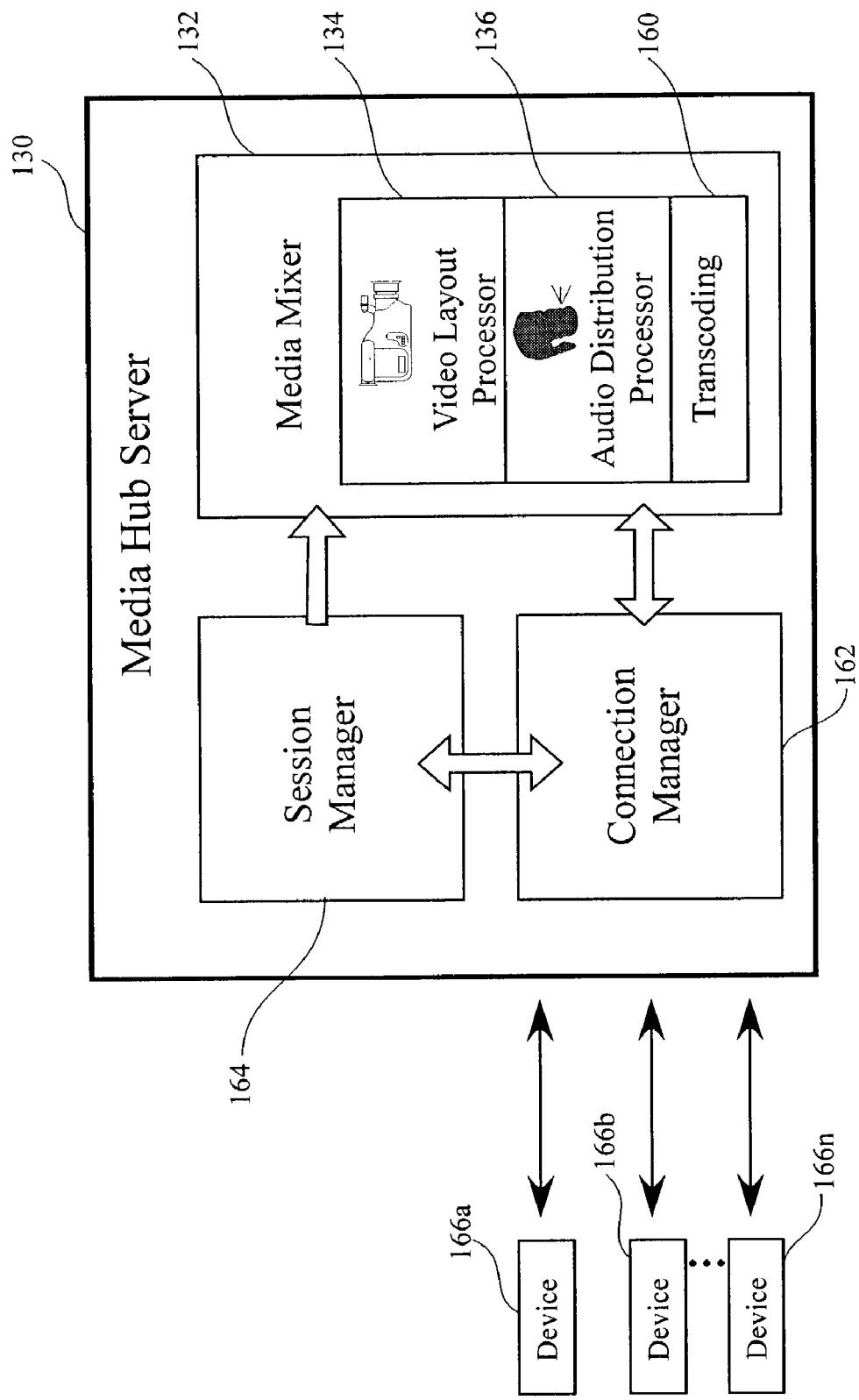
FIG. 6 is a high level schematic diagram of the media hub server in accordance with one embodiment of the invention.

FIG. 6 is a high level schematic diagram of the media hub server in accordance with one embodiment of the invention. Media hub server 130 includes media mixer 132. Video layout processor 134 is included in media mixer 132. In one embodiment, video layout processor 134 is responsible for generating a composite video image for each participant by combining all other participant's video using the chosen video layout and participant configuration information defined by each participant through the client monitor-back-channel network. A type of video layout chosen by a participant may depend upon the conference setting or the number of participants. For example, a two-user communication may appear identically to a peer-to-peer connection, i.e., each participant fills the other's video window. Alternatively, three or more users may present a tiled and configurable video display that will show only the other active members in a conference, i.e., a participant will not see his own video stream. Exemplary video layouts are described in more detail below with reference to FIGS. 12 and 13.

Audio distribution processor 136 is also included in media mixer 132. As audio plays a key role in any conference environment, the ability to hear the speaker or each of the other participants is important. In a meeting/workgroup conference, each participant typically wishes to hear all other participants. However, in a presentation/training conference, the speaker wishes to only hear a questioner while the audience wishes to primarily hear the speaker and possibly the questioner. These various configurations are options provided by media hub server 130 through audio distribution processor 136. In one embodiment, the audio options are extended to include listening to the loudest participant, or loudest group of participants, listening only to a single speaker with the capability of logically "passing the microphone" to an appropriate participant. In addition, the logical "speaker" often becomes the primary video image distributed to the other participants. In another embodiment, an interface allowing a participant to create a private audio link to any other participant is enabled through audio distribution processor 136, as will be explained further below.

Transcoding 160 is included in media mixer 132. Transcoding 160 enables the conversion of one format to another. Transcoding 160 generally performs functions that benefit the video and audio processing functions of the media mixer 132. One skilled in the art will understand that various transcoding methods need be used to perform video scaling, resolution and bitdepth conversions, media stream format conversions, adjustments for bitrate control, and other requirements. In one embodiment, transcoding may further result in more complete transformations. For example, an audio signal can be converted into text in one embodiment. The text can be supplied to a non-participant connection, such as the non-participant connection of FIG. 5. Session manager 164 is included in media hub server 130. Session manager 164 communicates with the components of connection manager 162 and supplies information to media mixer 132. Session manager 164 allocates and controls the logical rooms that group participant conference connections, thereby identifying separate conference sessions on media hub server 130. In one embodiment, collaboration models maintained by session manager 164 define sets of rules that will govern a given conference session and determine collaboration behavior. These rules are communicated to the media mixer 132 to adjust processing functions as described with reference to FIG. 8.

Connection manager 162 includes the conference channel, the back-channel controller and the event handler for each participant. The parallel networks defined by the conference channel and the back-channel with reference to FIG. 4 are processed through connection manager 162. Any suitable number of devices 166a-166n for a multi-participant conference, communicate with connection manager 162. As mentioned above, devices 166a-166n are thin clients in one embodiment of the invention.

Figure 7:
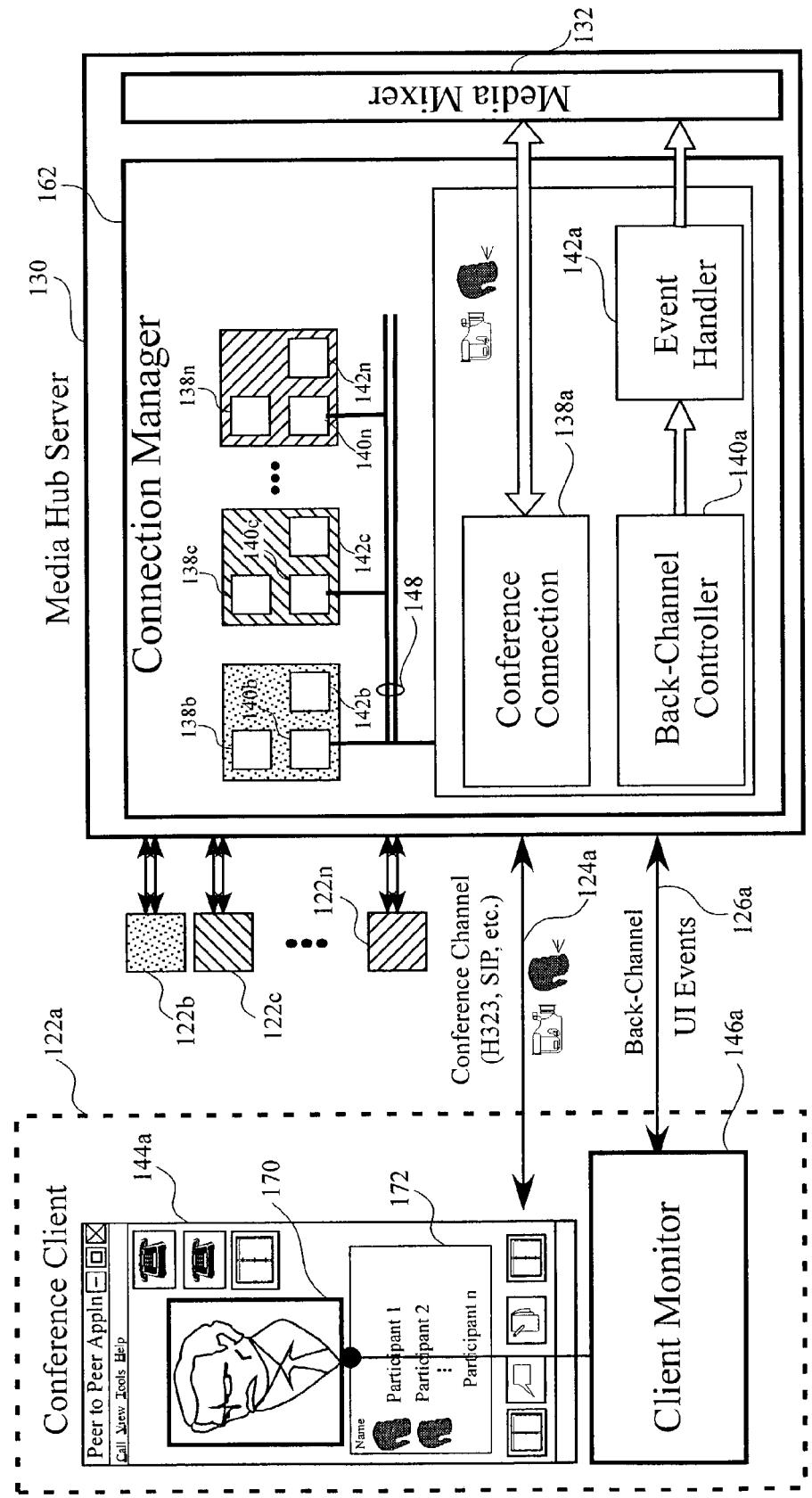
FIG. 7 is a more detailed schematic diagram of the client monitor connection between the client and the media hub server in accordance with one embodiment of the invention.

FIG. 7 is a more detailed schematic diagram of the client monitor connection between the client and the media hub server in accordance with one embodiment of the invention. The client for participant A 122a includes conference client 144a and client monitor 146a. Conference client 144a includes a peer-to-peer videoconferencing application having a graphical user interface (GUI) with a video display window 170. Additionally, the GUI provides a number of buttons enabling functionality suitable for videoconferencing software, as well as display box 172 identifying the conference participants. As mentioned above client monitor 146a monitors events within display window 170. CM 146a establishes back-channel connection 126a with media hub server 130. In one embodiment, when conference client 144a establishes conference channel connection 124a with media hub server 130, CM 146a also places a call to establish back-channel connection 126a. Back-channel connection 126a carries system information, such as user interface (UI) events, status information, participants connected, etc. In one embodiment, back-channel connection 126a is used as a control channel to change or define how the video and audio signals come across conference channel 124a. That is, the audio and video streams delivered to each client and how they are mixed are defined from the information provided from CM 146a over back-channel connection 126a.

Still referring to FIG. 7, media hub server 130 includes connection manager 162 and media mixer 132. It should be appreciated that session manager 164 of FIG. 6 is also included, although not shown here in FIG. 7. Connection manager 162 allocates components for each participant. For example, the components allocated to participant A includes conference connection 138a, back-channel controller 140a and event handler 142a for participant 122a. As discussed above, conference connection 138a acts as a conferencing endpoint for conferencing client 144a. Back-channel controller 140a maintains the communication link from client monitor 146a. Event handler 142a processes events from back-channel controller 140a. In one embodiment, event handler 142a maintains state information as necessary for processing of future events, for a respective participant. Event handler 142a communicates this information to media mixer 132, which in turn, configures the participant's user interface. The configuration of participant A's user interface is then transmitted through conference connection 138a and conference channel 124a to conference client 144a.

CM 146a, while monitoring video display window 170, may also define a user interface of which conference client 144a is a component along with a client user interface component. That is, CM 146a also includes a module defining a user interface as discussed in more detail with reference to FIG. 14. In one embodiment, CM 146a monitors the peer-to-peer application component and controls the client user interface. Here, further functionality can be provided through the client monitor in conjunction with the client monitor-back-channel network 148 connecting each of the client monitors as discussed with reference to FIG. 14. It should be appreciated that the configuration of the components allocated by connection manager 162 is similar for each of the remaining participants 122b-122n, as compared to the components allocated to participant 122a. Furthermore, each of participants 122a-122n are interconnected through client monitor-back-channel network 148 through the respective back-channel controllers.

Figure 8:
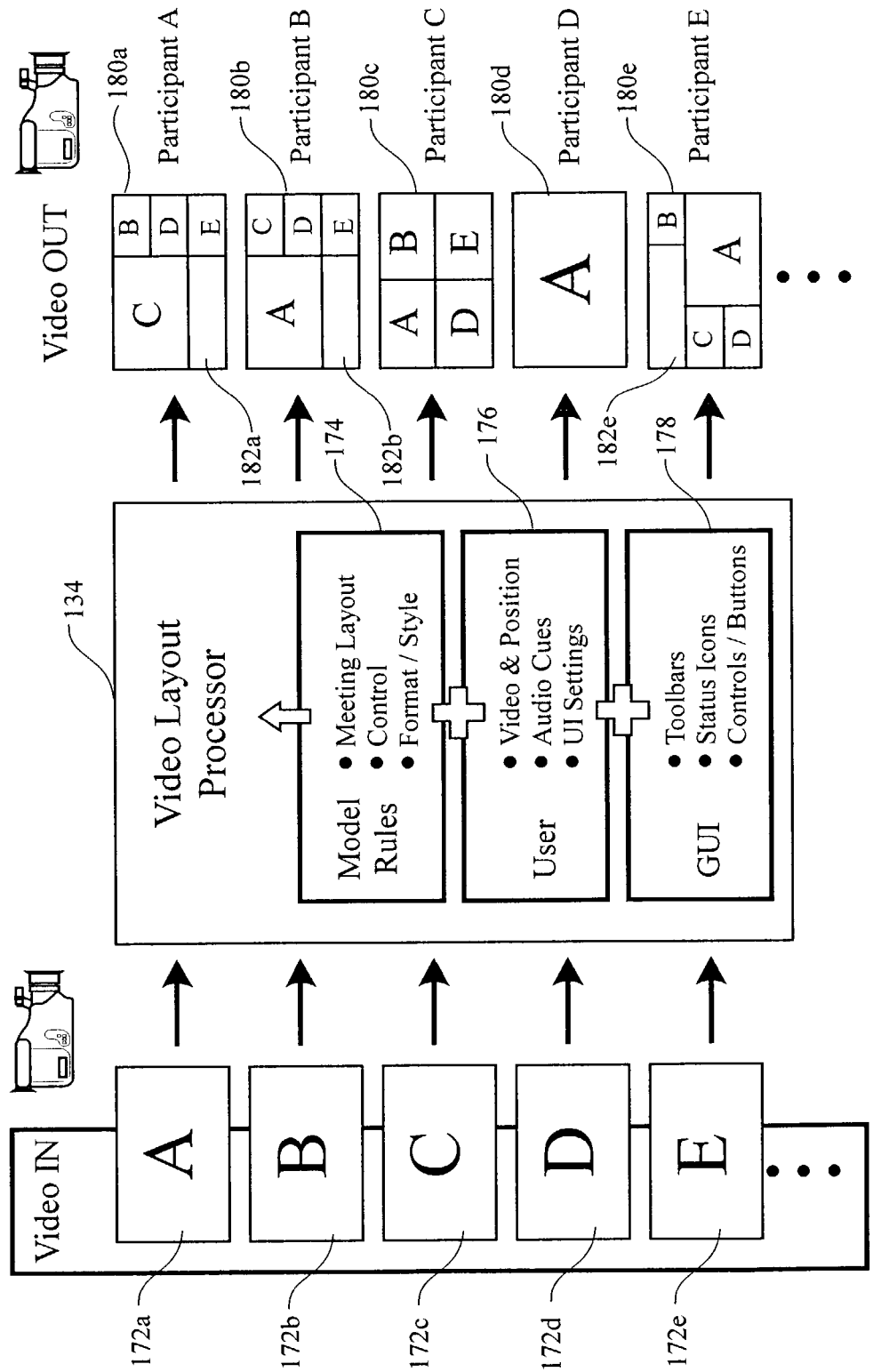
FIG. 8 is a schematic diagram of a video layout processor configured to generate a composite video image for each participant in accordance with one embodiment of the invention.

FIG. 8 is a schematic diagram of a video layout processor configured to generate a composite video image for each participant in accordance with one embodiment of the invention. As mentioned previously, the type of video layout chosen may depend upon conference settings or the number of participants. Video signals 172a-172e from five participants are supplied to video layout processor 134. Video layout processor 134 combines the incoming video streams to be distributed to the conference participants according to a set of criteria. The set of criteria includes GUI criteria 178, user criteria 176 and model rules criteria 174. Thus, each participant is supplied a video layout consisting of portions of the input video streams in one embodiment. Each video layout 180a-180e is supplied back to the respective participant over the conference channel. For example, video layout 180a can be displayed in video display window 170 of conference client 144a of FIG. 7. Thus, the peer-to-peer application on the conference client is displaying a peer that looks like four people.

Still referring to FIG. 8, video layout 180a is configured as the video of participant C as a larger portion of the display window, with participant's B, D, and E occupying equal smaller areas. Region 182a is reserved to allow the media hub server to insert its own user interface directly into the outbound video stream image supplied to each participant. Region 182a is added by media hub server as if it was a video display similar to another participant. Region 182a can be filled with buttons, color patches, icons or other suitable images as determined by the server user-interface. For example, one server user-interface may show an icon, that when clicked, changes the layout of all the participants. In another example, a speaker may have an interface that prevents audio from all participants until a question-answer session begins. A user-interface icon shown through the region identified as the server user interface may be used to pass or request control from the current speaker to another participant, i.e., who will continue the conference. It should be appreciated that while region 182a is described in particular as an interface that offers enhanced functionality to a participant, the same enhanced functionality is offered to each participant through region 182. Since the client monitor is watching a participant's activity within the display window, activity within server user interface region 182a can be captured in order for some action to occur. It should be appreciated that the server is inserting video to appear as an interface and is not creating an operating system icon control to place on top of the video in the application layer. Consequently, the server component can dynamically modify the GUI element, GUI function and GUI element location as directed by a user through the client monitor.

The video-distributed server user interface displayed through region 182a requires that the client monitor for participant A sends mouse actions, or other events, through the back-channel to the media hub server. The media hub server can then process these events according to the participant's server-provided user interface, i.e. based upon event location in the video image. Since the user interface is sent within the video stream, any media hub server configuration can be done through the video window. For example, mouse events over the video image can be sent back to the server to control some aspect of the display. It should be appreciated that this feedback loop establishes a closed user interface for feature control.

Any number of suitable layouts can be designed for video layouts 180a-180e as FIG. 8 does not represent all possible layout options available. For example, server user interface (SUI) region 182, or any other region, may be omitted or dynamically assigned. It should be appreciated that regions can be fixed or customizable. The server can have a fixed set of layouts, clients can utilize a defined protocol or language to define a layout, or an external structure can be reported to the server that defines a layout. The conferencing protocol between the conference client and the media hub server is used to negotiate the capabilities of the conference channel. The determined capabilities may further limit a participant's video layout options. One skilled in the art will appreciate that video and audio formats, video size, frame rates, and other attributes may be negotiated based upon conference protocols, network bandwidth, latency and other criteria.

In one embodiment, some participants may not have a video capture device, i.e., a camera, or they may choose to have their respective video capture device turned off. However, the participants not having a video capture device are allowed to join a conference. Here an icon symbol representing the participant will be shown to the other conference members. This symbol allows other members to identify the participant visually and control their user-interface accordingly. The server's media mixer will insert this icon into the video stream layout. Alternatively to the server providing default icons to be used for such participants, the back-channel connection can be utilized to deliver a custom participant icon from the participant's client monitor. The media mixer will use this provided custom icon in place of the server default. Where the participant does not have a video capture device, the participant can define the video display the other participants receive by defining a pre-selected image. In some cases, participants may choose to use this pre-selected icon instead of their transmitted video stream. For example, the participant may wish to leave the conference for a moment, wish their video image to remain anonymous, etc. The media hub server can accommodate such requests through instructions provided over the back-channel connection.

Video layout processor 134 uses a set of criteria to determine how to mix the video signals. The set of criteria are represented by GUI criteria 178, user criteria 176 and model rules criteria 174. Model rules criteria 174 are determined by the collaboration model being followed. For example, the collaboration models include a one-to-one model, a one to many model, a group discussion model, etc. Accordingly, a group collaboration may have different model rules than a one to many collaboration. User criteria 176 is defined by the user among options available through the active session's collaboration model. For example, a user may decide how to view multiple participants, i.e., how to configure the various regions such as video layout 180a-180e. GUI criteria 178 includes the functionality enabled through server user interface region 182 discussed above. In one embodiment, the set of criteria is arranged in a hierarchical order, i.e., model rules criteria 174 limit user criteria 176, which in turn limit GUI criteria 178.

Figure 9:
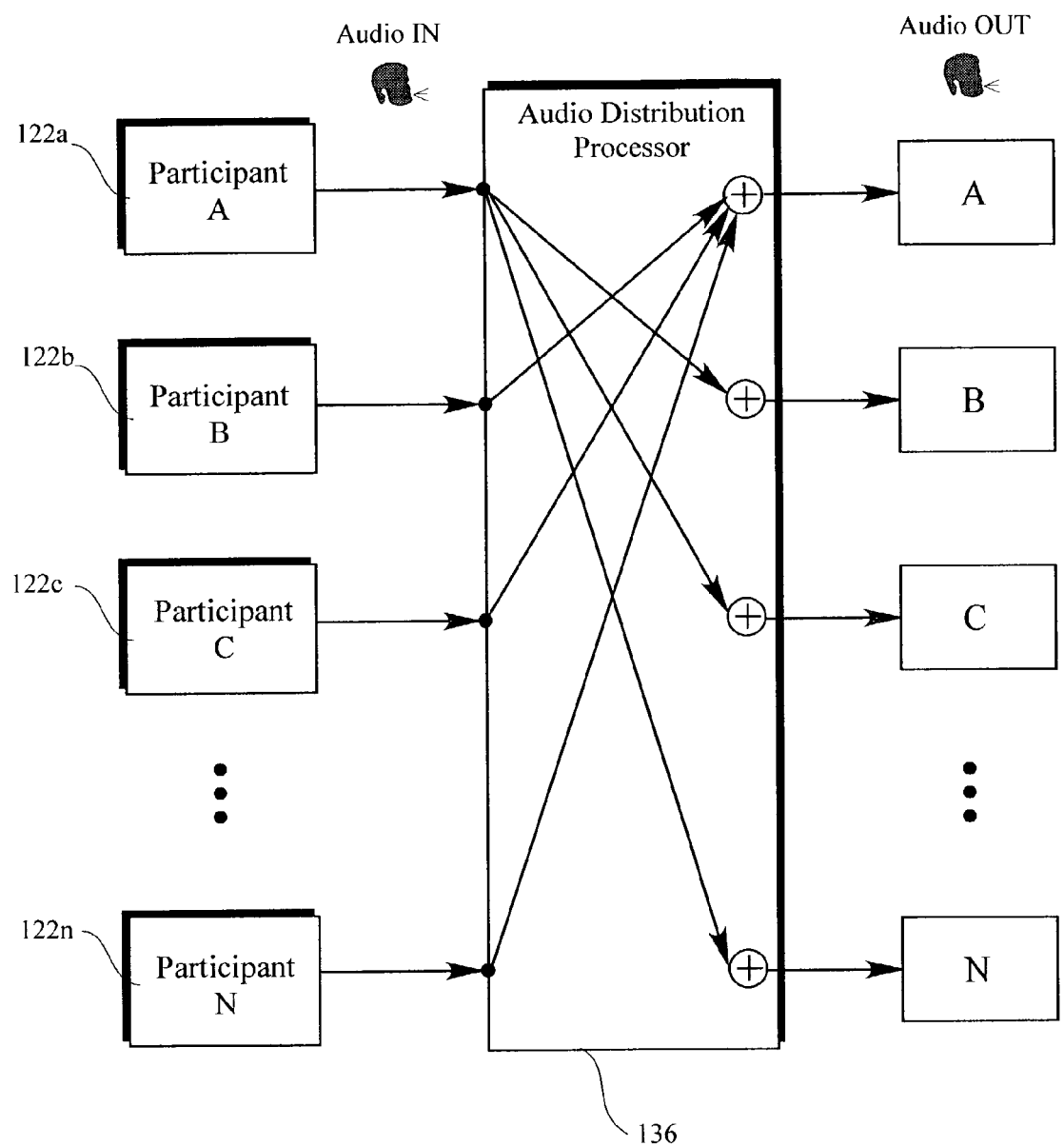
FIG. 9 is a schematic diagram of the audio distribution processor in accordance with one embodiment of the invention.

FIG. 9 is a schematic diagram of the audio distribution processor in accordance with one embodiment of the invention. The ability to hear the speaker or each of the other participants is a core function of audio distribution processor 136. As is generally known various collaboration models require different audio distribution. For example, a workgroup conference model has a different configuration than a training conference model as discussed above with reference to FIG. 7. For a training conference, each audience participant hears the speaker, and the speaker hears each audience participant. It is not required that each audience participant hear the audio from other participants until a participant has a question. Audio signals from each of participants A-N 122a-122n is provided to audio distribution processor 136 over the conference channel. Participant A 122a is provided with an audio signal from each of the other participants. Of course, participant A 122a does not listen to its own audio signal. As mentioned elsewhere, each participant may configure the volume of the audio signals and which signal is being listened to. It should be appreciated that audio signals are transmitted across the conference channel.

Figure 10:
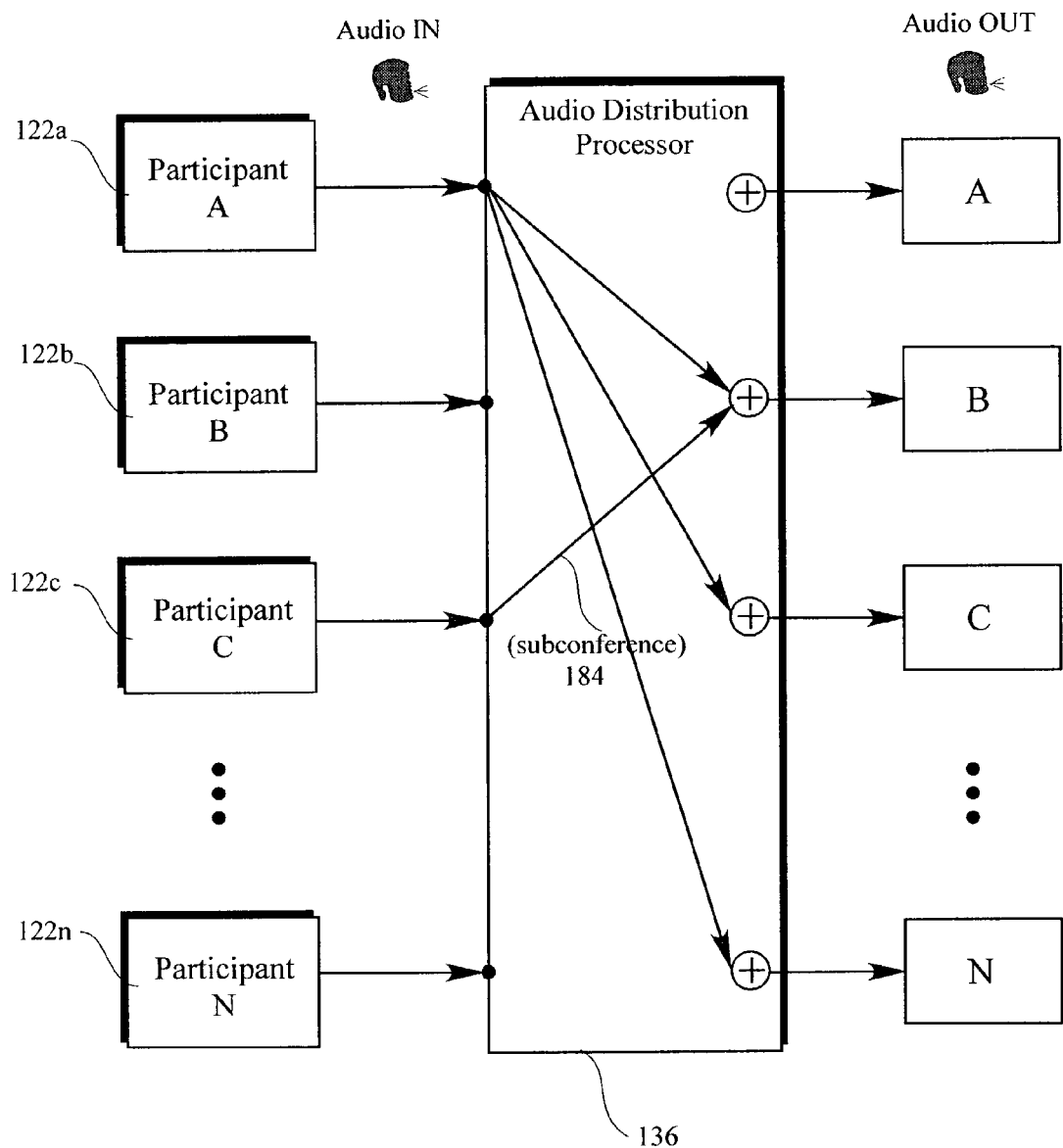
FIG. 10 is a schematic diagram of the audio distribution processor configured to provide private audio communications in accordance with one embodiment of the invention.

FIG. 10 is a schematic diagram of the audio distribution processor configured to provide private audio communications in accordance with one embodiment of the invention. The ability to create a private audio link allows an audience member to comment on the conference with another participant without other participants hearing this communication. In such an instance, the Video Layout Processor may optionally stall the video images of the linked participants or even supply a pre-selected image during the private communication. For example, if participant A 122a is speaking, participant C 122c can have a private conversation with participant B 122b, where intra-meeting audio channel 184 is created between participant B and participant C through audio distribution processor 136.

In one embodiment, intra-meeting audio channel 184 between two participants is constructed by one participant's mouse pointer being held over the video image of the other participant in a video layout on the conference client and then holding the mouse button down. Thus, participant C 122*c* holds his mouse pointer over the image of participant B 122*b* to create the intra-meeting audio channel. The connection remains while the mouse button is in the down state. In one embodiment, the receiving participant will see a video cue that can be used to determine who is speaking privately with him. This video cue is inserted into the video streams by the Video Layout Processor. It should be appreciated that the client monitor is watching the video display window, therefore, the mouse activity is reported to the media hub server through the back-channel. It will be apparent to one skilled in the art that a participant can target his audio to one or more of the participants. For example, participant C 122*c* can target his audio to participant B 122*b* and participant N 122*n* to set up a private audio channel between the three participants. In another embodiment, the audio distribution processor adjusts the volume of the main speaker, participant A 122*a*, during a sub-conference between participant B 122*b* and participant C 122*c*. As discussed above with reference to FIG. 8, audio distribution processor 136 is subject to similar set-up criteria as the video layout processor. That is, the model rules criteria establish the rule of collaboration, the user criteria establish a user's preferences within the model rules and the GUI criteria insert some audio signal into the conference. For example, the model rules may preclude sub-conferencing in one embodiment.

Figure 11A:
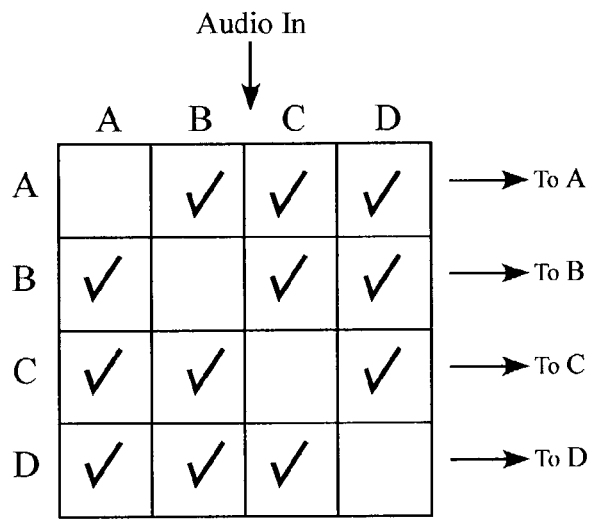
FIGS. 11A-11C are schematic diagrams of patterns for mixing audio streams in accordance with one embodiment of the invention.
Figure 11B:
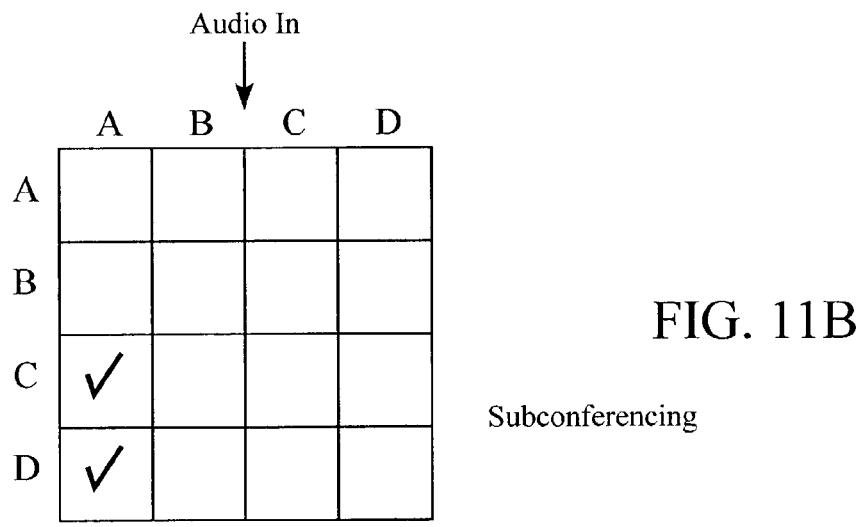
Figure 11C:
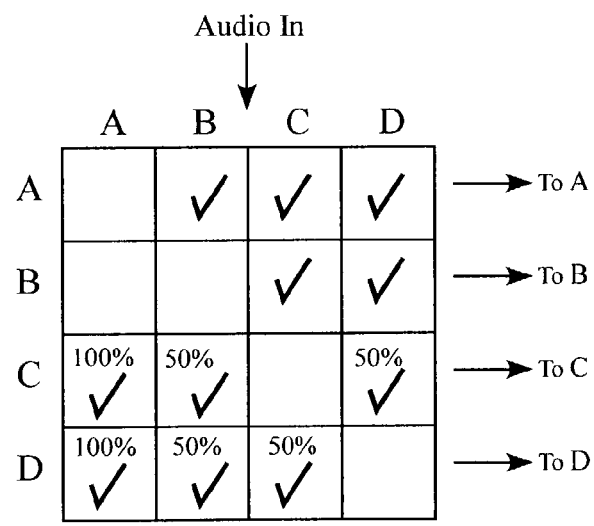

FIGS. 11A-11C are schematic diagrams of patterns for mixing audio streams in accordance with one embodiment of the invention. FIG. 11A shows a matrix of four participants, A-D, where each participant is enabled to receive a signal from each of the other participants. For example, participant A is enabled to receive a signal from participants B,C and D. Participant B is enabled to receive a signal from participants A, C and D and so on. FIG. 11B illustrates the matrix for a sub-conferencing audio link between participants A, C and D. Here, participant A has created a private audio link with participants C and D. That is, participant B will not receive the audio signal being sent from A here. FIG. 11C illustrates the resulting matrix when the sub-conferencing feature between participants A, C, and D is activated. Here, participant B will not receive any signal from participant A during the sub-conference. Additionally, during the sub-conference between participants A, C and D, the volume for the audio from participant A to C and D is at 100% of the audio signal from participant A, while the volume for the remainder of the participants being received by C and D is set at 50%. Of course, any suitable percentages of volume can be used here to allow a participant to hear the audio from the person initiating the sub-conference. For example, the volume of the other participants can drop to zero (0) in one embodiment.

Continuing with the sub-conferencing example above, the sub-conference initiated by participant A can be configured as a one-way audio path or as a two-way audio path. That is, in one embodiment participant A's action of initiating a sub-conference between participants C and D does not effect the control of participants C and D of their own audio. Thus, participants C and D must use the mouse-down interface if they want to comment back to selected participants, as participant A has done for the sub-conference. In another embodiment, participant A's initiation of the sub-conference with participants C and D creates communication links as if participant C selected a private link with participants A and D and as if participant D selected a private link with participants A and C. Thus, participant A's action blocks the audio from participants C and D from being heard by other participants, i.e., participant B.

Figure 12:
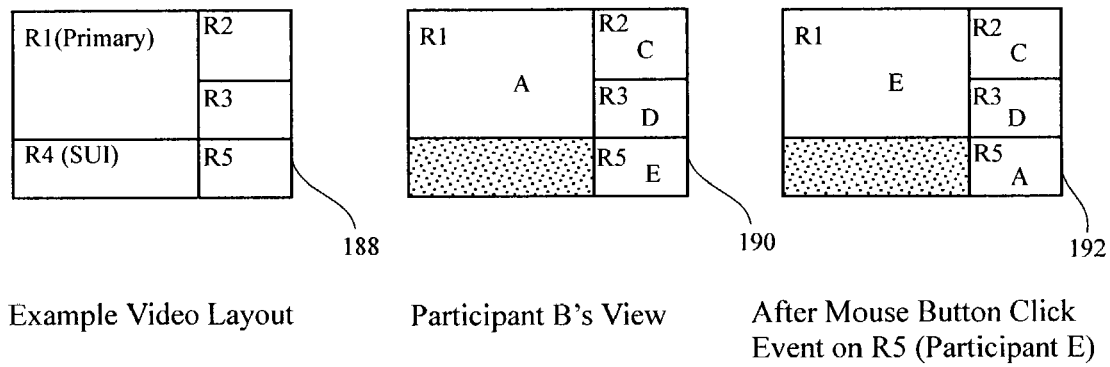
FIG. 12 is a schematic diagram of the effect of an event on a conference client's video display window in accordance with one embodiment of the invention.

FIG. 12 is a schematic diagram of the effect of an event on a conference client's video display window in accordance with one embodiment of the invention. Example video layout 188 is configured such that a primary participant video is in region R1 while other participants are located in regions R2, R3 and R5. Region R4 contains the server user interface (SUI) as discussed above. More specifically, participant B's video layout can be configured with participant A in the primary region and participants C, D, and E in the secondary regions as in video layout 190. If participant B clicks the mouse while the pointer is over the region displaying participant E, then participant E will be moved to the primary region and participant A is moved from the primary region to the region previously occupied by participant E, as illustrated in video layout 192. Even conference video can be thought of as a GUI element and modified similarly. For example, clicking on a participant's video region can result in a change in brightness of the image sent by the server component.

Figure 13:
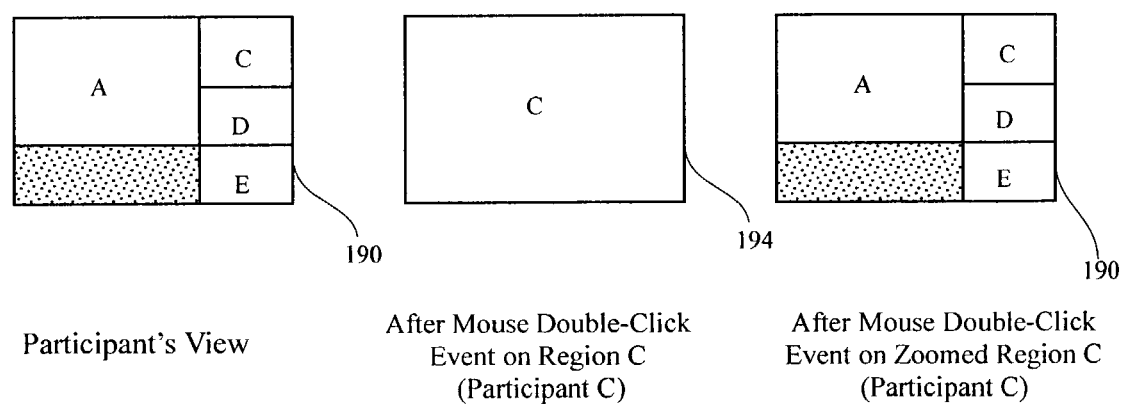
FIG. 13 is a schematic diagram of another effect of an event on a conference client's video display window in accordance with one embodiment of the invention.

FIG. 13 is a schematic diagram of another effect of an event on a conference client's video display window in accordance with one embodiment of the invention. Here, a participant double clicks on participant C of video layout 190. The double-click event results in video layout 194 where the image of participant C occupies the entire video display region. Furthermore, double-clicking the mouse while the pointer is over the display of participant C will return the image to video layout 190. It should be appreciated that any suitable number of events can be defined to allow a participant to configure the video display region. For example, as mentioned above, by clicking and holding the mouse button over a video of a participant on the video display layout will establish an audio connection with that participant. Thus, a private audio link for a sub-conference can be created. As with other common application interfaces, this list of events can be extended to include a particular mouse button (i.e. Left, Middle, Right) and any keyboard state information at the time of mouse activity (i.e. Shift-Key pressed, Ctrl-Key pressed, etc.). Other events including a mouse movement tracking and keystrokes may also be defined. In one embodiment, a server interface may provide a region in the video layout that is shown to audience participants in a training conference. When clicked by a participant, indicating that the participant has a question, the speaker's user-interface may show a visual cue to identify the member with the question. In response, the speaker could have an interface to manage a virtual "microphone", allowing the participant the floor the question, yet retain the ability to capture the microphone back for conference continuation.

The back-channel is not reserved only for server configuration and user-interface protocols. It can also be used as a communication channel between participants. Client monitors can communicate among themselves by sharing and exchanging information on the back-channel through the media hub server. For example, the client monitor may wish to present a separate user-interface in parallel to that provided by the conference client. In one embodiment, the client monitor could capture the application window of a POWERPOINT application on the participant's computer.

This information could be transmitted, say as a JPEG image, to the other client monitors where it would be displayed. In this way, a participant could share a high-resolution slide image of his presentation with all other participants without relying solely on the small resolution of an attached video capture device.

Conference content information, summary notations, chat, or other connection status information can be relayed among the participants on the back-channel. In one embodiment, a specialized protocol to the media hub server allows for reporting activity and membership of participants to a conference. As with the example mentioned above, the system displays shared JPEG images on each client's machine in a resizable window. The received images can be scaled based upon window size or viewed according to actual pixel resolution using scrollbars.

FIG. 14 is a schematic diagram of a client monitor graphical user interface which includes the user interface provided by the conference client in accordance with one embodiment of the invention. Client monitor GUI 200 includes conference client application window GUI 202 and client monitor user interface 204. In one embodiment, conference client application window GUI 202 is brought in as a component of client monitor GUI 200. That is, the code of the peer-to-peer application is running GUI 202. It should be appreciated that GUI 202 is another representation of the GUI for conference client 144a of FIG. 7. Client user interface 204 allows for enhanced functionality to occur through the back-channel. For example, files, documents, images, etc. can be sent to other client monitors across the back-channel to be displayed in document viewer region 206 associated with that client monitor. In particular, a POWERPOINT presentation that a speaker is discussing may be viewed by each of the participants. It should be appreciated that GUI 200 can be opened up with the peer-to-peer application being a component of GUI 200. Alternatively, the peer-to-peer application can be opened up and when enhanced functionality is required another GUI is opened up. It will be apparent to one skilled in the art that any suitable navigation tool, such as scroll bars, drop down menus, tabs, icons, buttons, etc. can be used to provide the options for a participant to choose from the offered functionality.

Client user interface 204 also includes participants' region 208 listing the participants of the conference. Files associated with a particular participant can be listed as is shown with respect to participant 1 of participants' region 208. Local files region 210 includes files that can be shared between participants. Devices' region 212 provides remote devices configured to supply information for the conference for a particular client. For example, a scanner in communication with the respective client can be used to scan documents so that the participants can share the documents. A second document viewer region 214 is included to view a document in shared space. Additionally, a document being scanned from the scanning device listed in region 212 can be viewed in region 214. Thus, as a document is being scanned, the participant can view the document in region 214. Conference log region 216 provides a running log of participants joining the conference and the time at which the participant joined. It should be appreciated that the conference log could record other suitable items such as when participants signed off. Spare region 218 can be used to provide any further suitable user interface for the videoconference environment. It should be appreciated that any number of suitable configurations can be supplied for GUI 200. In one embodiment, the back-channel controller allows the server to distribute the documents between clients, similar to the distribution of video and audio signals over the back-channel network.

In one embodiment, a user can download the client monitor over a distributed network. Here, the user can then utilize a server managed by an application service provider or a server on a local network allowing conferencing within an organization or division of a large corporation. Additionally, the code enabling the functionality described herein can be incorporated into firmware of devices used for videoconferencing, such as video projectors. Accordingly, the images from the projector can be supplied through the back-channel to participants of the conference.

Figure 15:
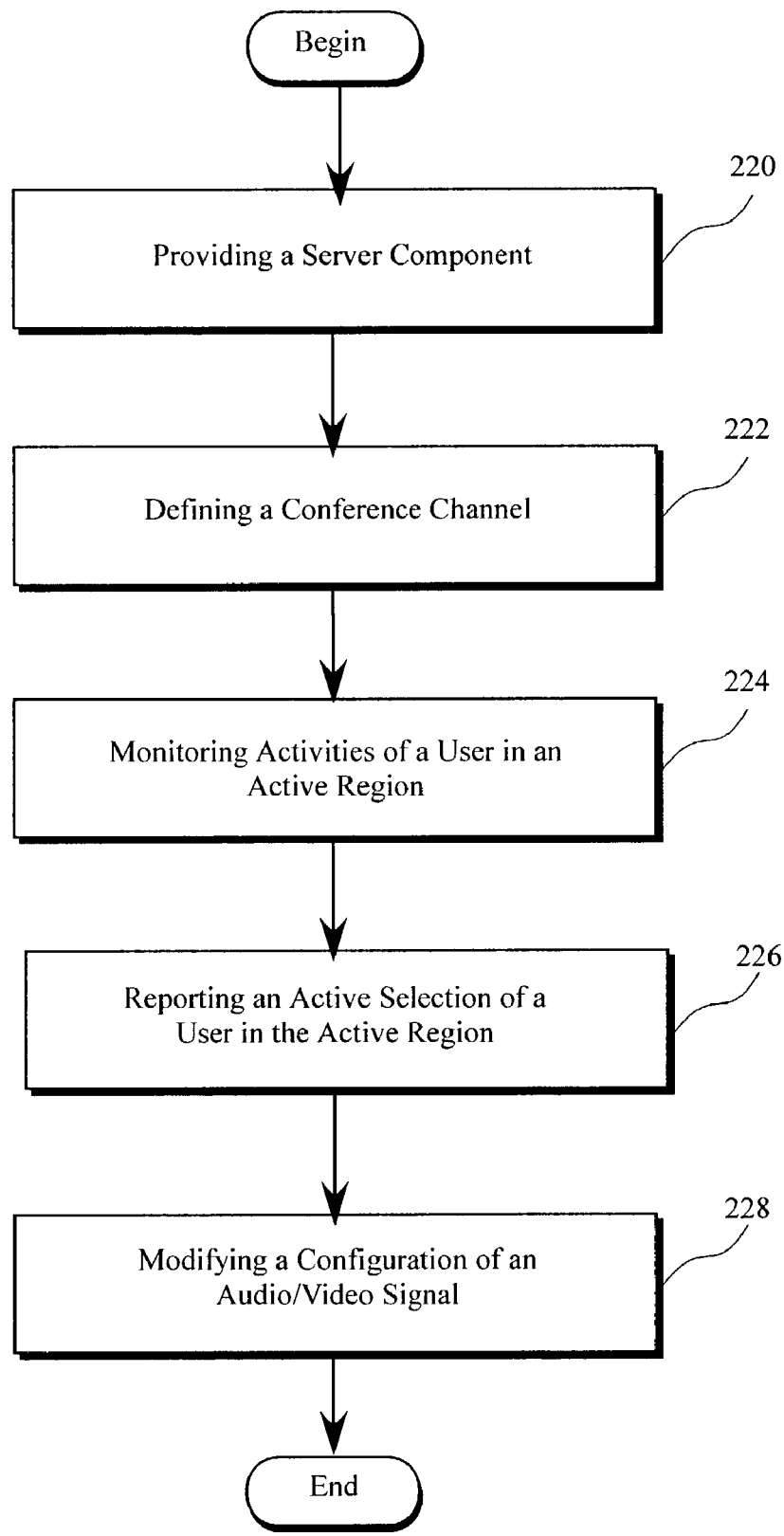
FIG. 15 is a flowchart diagram of the method operations for creating a multi-user conferencing environment between conference clients having peer-to-peer conferencing applications in accordance with one embodiment of the invention.

FIG. 15 is a flowchart diagram of the method operations for creating a multi-user conferencing environment between conference clients having peer-to-peer conferencing applications in accordance with one embodiment of the invention. The method initiates with operation 220 where a server component is provided. In one embodiment, the server component is configured to emulate a peer-to-peer connection for each of the conference clients, One suitable server component is the media hub server component described above. The method then advances to operation 222 where a conference channel is defined for communication between conference clients and the server component. The conference channel is configured to provide real time audio and video data in one embodiment. In another embodiment, the conference channel is configured to support a conferencing protocol such as the H.323 protocol and the SIP protocol.

The method of FIG. 15 then proceeds to operation 224 where activities of a user in an active region are monitored. Here, a client monitor can monitor the video display region as described above. The activities being monitored include mouse activities of a user in the video display region. The method then moves to operation 226 where an active selection of a user in the active region is reported. As described with reference to FIGS. 12 and 13 a user can click on a region of the video layout of the display window. The active selection, i.e., mouse click, is reported to the server component by the client monitor over the back-channel in parallel to the conference session being transmitted over the conference channel. The method then advances to operation 228 where the configuration of an audio/video signal being supplied to a conference client associated with the user is modified, in response to the active selection reporting being received by the server component. For example, the video display window can be modified here as discussed above with reference to FIG. 12.

In summary, the above described invention provides a videoconferencing system having enhanced functionality through a back-channel network. The system takes a preexisting peer-to-peer application and provides a conference connection so that the application sees a peer-to-peer connection, however, in reality audio and video signals from multiple participants are being provided. The back-channel network acts as a parallel network to the conference channel. A client monitor watches a display window of the peer-to-peer application for user events, such as mouse oriented operations. Data captured by the client monitor is provided over the back-channel to a media hub server. The media hub server responds to the data by modifying or configuring the video and audio signals supplied to each participant over the conference channel. The conference system is configured to be joined by other non-participants through the back-channel network. In addition, the back-channel allows for files to be shared between participants through a client interface defined and controlled through the client monitor. In one embodiment, a peripheral client device, such as a scanner is enabled to scan a document into the system so that the document can be provided to each by the back-channel network. The document can be viewed by each client through the client interface.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The invention can also be embodied as computer readable code on a computer readable medium. The computer readable medium is any data storage device that can store data which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A videoconferencing system configured to utilize peer-to-peer videoconferencing software to provide a multi-participant conference environment for a plurality of participants, comprising:
    a client component, the client component including,
        a conference client enabled to execute peer-to-peer videoconferencing software, the conference client communicating video and audio data across a conference channel; and
        a client monitor configured to monitor both, whether the conference channel is active and participant-executed events within a video window displayed by the conference client, wherein the participant-executed events within the video window are communicated across a back-channel connection, the back-channel connection established when the conference channel is active;
    a server component, the server component having a back-channel controller in communication with the client monitor through the back-channel connection, the server component receiving each of the participant-executed events, interpreting each received event as a request to change a configuration of an audio/video stream being delivered to the client component, and changing the configuration of the audio/video stream being delivered to the client component in accordance with request.

2. The videoconferencing system of claim 1, wherein the client monitor defines a graphical user interface of which the video window displayed by the conference client is a component.

3. The videoconferencing system of claim 2, wherein the graphical user interface enables access to files of the conference client.

4. The videoconferencing system of claim 3, wherein the files of the conference client are available to each of the plurality of participants over the back-channel connection.

5. The videoconferencing system of claim 1, wherein the server component includes a media mixer configured to compose a composite audio/video signal for each of the plurality of participants from individual audio/video signal from each of the plurality of participants.

6. A videoconferencing system, comprising:
    a client component including a client in communication with a client monitor, the client monitor being configured to detect user-executed events within a display window displayed by the conference client;
    a server component;
    a conference channel defined between the client component and the server component, the conference channel providing a first path for real-time video/audio data to be exchanged between the client component and the server component for a videoconference; and
    a back-channel defined between the client component and the server component providing a second path for the detected user-executed events to be exchanged between the client monitor and the server component;
    wherein the server component is configured to change the video layout in the display window of the client component in response to, and in accordance with, each detected user-executed event received.

7. The videoconferencing system of claim 6, wherein the client includes a peer-to-peer videoconferencing application with which the display window is associated.

8. The videoconferencing system of claim 6, wherein each user-detected event is one of mouse movement, mouse clicks and keyboard state information.

9. The videoconferencing system of claim 6, wherein the client monitor is configured to provide a user interface, the user interface including a display window of a peer-to-peer videoconference application associated with the client.

10. The videoconferencing system of claim 6, wherein the server component is configured to enable access to a non-participant of the videoconference through a back-channel network associated with the back-channel.

11. The videoconferencing system of claim 6, wherein the server component includes,
    a media mixer enabling distribution of a composite audio/video data stream to the client component, the media mixer in communication with a back-channel network to enable a private audio link between two clients.

12. The videoconferencing system of claim 6, wherein each detected user-executed event is communicated to a media mixer of the server component.

13. A conferencing system configured to provide a multi-user conference environment to deliver customizable information to each of a plurality of conference clients, comprising:
    a plurality of client monitors, one associated with each of the plurality of conference clients, each client monitor configured to monitor an activity occurring over a video frame displayed by the associated conference client;
    a server component, the server component including,
        a media hub server component providing a conference connection, the media hub server component including, a media mixer configured to assemble audio and video data to be supplied to the conference client from audio and video data received by the media mixer from a plurality of conference clients, the media mixer including,
  a video layout processor configured to generate a composite video image for each of the plurality of conference clients, and to change the composite video image for any of the conference clients in response to, and in accordance with, the activity detected over a video frame displayed by that conference client, and
  an audio distribution processor for providing an audio signal for each of the plurality of conference clients;
a connection manager allowing connections of several participants into logical rooms for shared conference communications, the connection manager including,
  a back-channel controller enabling communication between the client monitor and the media hub server component, and
  an event handler configured to insert interface data into an outbound video stream image through the video layout processor.

14. The conferencing system of claim 13, wherein the interface data enables the conference client to access local files to be shared with the plurality of conference clients, the local files associated with a computer included in the client component.

15. The conferencing system of claim 13, wherein the client component and the server component are in communication through a conference channel carrying real time audio/video data and a back-channel carrying system information.

16. The conferencing system of claim 13, wherein the conference client includes,
  a peer-to-peer videoconference application in communication with the conference connection of the media hub server component.

17. A graphical user interface (GUI) for a videoconference rendered on a computer monitor, comprising:
  a first region defining an integrated video component, the integrated video component associated with a client, the integrated video component having a display window in which a plurality of participant video images are displayed, the display window being monitored to detect user activity within the display window, the detected user activity being indicative of a request to change the layout of the plurality of participant images being displayed; and
  a second region providing access to files of a computer system; the second
  region allowing a user to select one of the files for transmission to a server supporting the videoconference, wherein the server communicates the selected one of the files to participants of the videoconference;
  wherein the integrated video component is provided over a first communication link with the server and information captured in the second region is provided to the server over a second communication link; and
  wherein the first communication link is conference channel and the second communication link is a back-channel.

18. The GUI of claim 17, wherein the user activity is one of mouse movement, mouse clicks and keyboard state information.

19. The GUI of claim 17, wherein the first region is associated with a peer-to-peer videoconferencing application.

20. The GUI of claim 17, wherein the second region enables a peripheral device to augment conference content viewable by the participants.

21. The GUI of claim 20, wherein the peripheral device is one of a scanner and a video projector.

22. A method for providing a multi-user conference environment for multiple participants, comprising:
  establishing a server component for enabling a conference channel connection between the server component and each of a plurality of conference clients associated with the multiple particants respectively;
  providing audio and video data from each conference client to the server component over the conference channel connection;
  communicating system preferences to the server component for each of the plurality of conference clients over a back-channel connection;
  distributing combined audio and video data to each of the conference clients over the conference channel connection, the combined audio and video data presented to particular conference client as defined by the system preferences for that conference client;
  monitoring an interaction of each participant with a video image presented on the corresponding conference client;
  transmitting a signal indicating the interaction to the server component over the back-channel connection; and
  in response to the signal indicating the interaction, modifying the combined audio and video data distributed to the conference client for which the interaction was detected over the conference channel connection.

23. The method of claim 22, wherein the conference channel connection support one of H.323 protocol and session initiation protocol (SIP).

24. The method of claim 22, wherein the system preferences include one of a position of an image in a video layout for each of the multiple clients, a brightness of the video layout and a volume level associated with participants displayed in the video layout.

25. The method of claim 22, wherein the interaction is associated with one of a mouse movement and a keyboard signal.

26. A method for creating a multi-user conferencing environment between conference clients having peer-to-peer conferencing applications, comprising:
  providing a server component configured to emulate a peer-to-peer connection for each of the conference clients, the server component being further configured to provide a user-configurable audio/video signal to each of the conference clients;
  defining a conference channel for communication between conference clients and the server component;
  monitoring activities of a user in an active region of a video display window associated with one of the conference clients;
  reporting an active selection made by that user in the active region of that user's conference client video display window to the server component, the reporting occurring outside of the conference channel; and
  in response to the active selection reporting being received by the server component, modifying the configuration of the audio/video signal provided to the conference client associated with the user making the active selection.

27. The method of claim 26, wherein the server component is a media hub server.

28. The method of claim 26, wherein the conference channel is configured to communicate real time audio and video data between the conference clients and the server component.

29. The method of claim 26, wherein the method operation of reporting an active selection by a user occurs over a back-channel.

30. The method of claim 29, wherein the back-channel defines a communication link between a client monitor configured to track activities in a video display window of one of the conference clients and a back-channel controller of the server component.

31. A computer readable media having program instructions for creating a multi-user conferencing environment between conference clients having peer-to-peer conferencing applications and a server component configured to emulate a peer-to-peer connection for each of the participants, comprising:

program instructions for defining a conference channel for communication between conference clients and the server component;

program instructions for enabling the server component to provide a user-configurable video and audio signal to each of the conference clients;

program instructions for monitoring activities of a user in a video display window associated with one of the conference clients;

program instructions for reporting the monitored activities to the server component over a back-channel connection; and program instructions for modifying the video and audio signal provided to the conference client associated with the user performing the activities in response to the reported activities being received by the server component.

32. The computer readable media of claim 31, wherein the server component is a media hub server.

33. The computer readable media of claim 31, wherein the back-channel connection defines a communication link between a client monitor configured to track activities in a video display window of one of the conference clients and a back-channel controller of the server component.

34. The computer readable media of claim 31, further including:

providing program instructions for enabling a private audio link between two participants during a videoconference session.

* * * * *